US011933181B2

(12) United States Patent
Le Biez et al.

(10) Patent No.: US 11,933,181 B2
(45) Date of Patent: Mar. 19, 2024

(54) ABRADABLE COATING FOR ROTATING BLADES OF A TURBOMACHINE

(71) Applicant: SAFRAN AIRCRAFT ENGINES, Paris (FR)

(72) Inventors: Philippe Charles Alain Le Biez, Moissy-Cramayel (FR); Nicolas Droz, Moissy-Cramayel (FR); Lisa Pin, Moissy-Cramayel (FR); Serge Georges Vladimir Selezneff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/746,417

(22) Filed: May 17, 2022

(65) Prior Publication Data

US 2022/0282634 A1 Sep. 8, 2022

Related U.S. Application Data

(62) Division of application No. 17/269,854, filed as application No. PCT/FR2019/051943 on Aug. 20, 2019, now Pat. No. 11,359,508.

(30) Foreign Application Priority Data

Aug. 22, 2018 (FR) ....................................... 1857581

(51) Int. Cl.

*F01D 11/12* (2006.01)
*C23C 4/073* (2016.01)
*C23C 4/11* (2016.01)

(52) U.S. Cl.

CPC ............ *F01D 11/122* (2013.01); *C23C 4/073* (2016.01); *C23C 4/11* (2016.01); *F05D 2300/611* (2013.01)

(58) Field of Classification Search

CPC ............. F01D 11/122; F05D 2300/311; F05D 2300/6032; F05D 2300/6033; C23C 4/073; C23C 4/08; C23C 4/11; C23C 30/00

See application file for complete search history.

(56) References Cited

U.S. PATENT DOCUMENTS 5,385,760 A * 1/1995 Schassberger ......... C25D 15/00 427/443.1
6,916,529 B2 * 7/2005 Pabla .................... F01D 11/127 428/335

(Continued)

FOREIGN PATENT DOCUMENTS

CN 1013003313 A 11/2008
CN 104193330 A 12/2014

(Continued)

OTHER PUBLICATIONS

Nickel Alloy Material Property Datasheet, https://matweb.com/search/datasheet_print.aspx?matguid=8808b026f7c14d2f8d61f2d476aaeb26, retreived May 5, 23 (Year: 2023).*

(Continued)

*Primary Examiner* — Brian P Wolcott

(74) *Attorney, Agent, or Firm* — Pillsbury Winthrop Shaw Pittman LLP

(57) ABSTRACT

An abradable coating for a turbomachine part, includes a matrix made of a first metal material and particles made of a second metal material that are dispersed in the matrix, the first metal material having a melting temperature greater than 900° C., the second metal material having a melting temperature at least 50° C. lower than the melting temperature of the first metal material.

6 Claims, 2 Drawing Sheets

(56) References Cited

U.S. PATENT DOCUMENTS

| | | | | |
|---|---|---|---|---|
| 7,163,370 | B2 * | 1/2007 | Kokusho | F01D 11/122 415/200 |
| 7,165,946 | B2 * | 1/2007 | Nava | C23C 4/04 416/241 A |
| 8,790,078 | B2 | 7/2014 | Zajchowski | |
| 9,598,973 | B2 * | 3/2017 | Ghasripoor | F01D 11/122 |
| 10,247,027 | B2 * | 4/2019 | Rioux | F04D 29/526 |
| 10,267,174 | B2 * | 4/2019 | Liu | C22C 1/08 |
| 10,428,437 | B2 * | 10/2019 | Werner | C25D 3/12 |
| 10,544,698 | B2 * | 1/2020 | Stoyanov | F01D 5/02 |
| 10,669,878 | B2 * | 6/2020 | Liu | C22C 9/06 |
| 2005/0100726 | A1 | 5/2005 | Millard | |
| 2006/0068189 | A1 | 3/2006 | Raybould | |
| 2007/0098987 | A1 | 5/2007 | Huddleston et al. | |
| 2009/0207413 | A1 | 8/2009 | Carpenter | |
| 2009/0297718 | A1 | 12/2009 | Sarrafi | |
| 2010/0284797 | A1 | 11/2010 | Jarrabet et al. | |
| 2012/0099968 | A1 | 4/2012 | Zajchowski | |
| 2013/0025291 | A1 | 1/2013 | Meschter | |
| 2013/0102805 | A1 | 4/2013 | Hong | |
| 2013/0122259 | A1 | 5/2013 | Lee | |
| 2014/0093360 | A1 | 4/2014 | Strock | |
| 2014/0147242 | A1 | 5/2014 | Ghasripoor | |
| 2015/0075327 | A1 * | 3/2015 | Werner | C22C 30/00 75/228 |
| 2015/0252195 | A1 | 9/2015 | Kugel | |
| 2016/0003092 | A1 | 1/2016 | Chamberlain | |
| 2016/0146034 | A1 | 5/2016 | Schuster | |
| 2016/0362989 | A1 | 12/2016 | Subramanian et al. | |
| 2017/0058405 | A1 | 3/2017 | Tang | |
| 2017/0297298 | A1 | 10/2017 | Tsumura | |
| 2017/0305797 | A1 | 10/2017 | Nasiri | |
| 2018/0186144 | A1 | 7/2018 | Durrett | |
| 2018/0222807 | A1 | 8/2018 | Shim | |
| 2019/0093499 | A1 | 3/2019 | Sippel | |
| 2019/0186281 | A1 * | 6/2019 | Stoyanov | F01D 11/122 |
| 2019/0323112 | A1 | 10/2019 | Shim | |
| 2021/0148238 | A1 | 5/2021 | Bianchi | |

FOREIGN PATENT DOCUMENTS

| | | | |
|---|---|---|---|
| CN | 105623322 | A | 6/2016 |
| CN | 106232944 | A | 12/2016 |
| EP | 0 751 104 | A2 | 1/1997 |
| EP | 1 734 146 | A1 | 12/2006 |
| EP | 3 276 038 | A1 | 1/2018 |
| WO | WO 2014/055299 | A1 | 4/2014 |

OTHER PUBLICATIONS

Aluminum Material Property Datasheet, https://matweb.com/search/DataSheet.aspx?MatGUID=0cd1edf33ac145ee93a0aa6fc666c0e0, retreived May 5, 23 (Year: 2023).*

Copper Material Property Datasheet, https://www.matweb.com/search/DataSheet.aspx?MatGUID=9aebe83845c04c1db5126fada6f76f7e&ckck=1, retreived May 5, 23 (Year: 2023).*

International Search Report as issued in International Patent Application No. PCT/FR2019/051943, dated Nov. 13, 2019.

International Preliminary Report on Patentability and the Written Opinion of the International Searching Authority as issued in International Patent Application No. PCT/FR2019/051943, dated Feb. 23, 2021.

* cited by examiner

ABRADABLE COATING FOR ROTATING BLADES OF A TURBOMACHINE

CROSS-REFERENCE TO RELATED APPLICATIONS

This application is a divisional of U.S. application Ser. No. 17/269,854, filed Feb. 19, 2021, which is the U.S. National Stage of PCT/FR2019/051943, filed Aug. 20, 2019, which in turn claims priority to French patent application number 1857581 filed Aug. 22, 2018. The content of these applications are incorporated herein by reference in their entireties

BACKGROUND

The present invention relates to the general field of abradable material coatings for turbomachines, and particularly for aircraft engines.

In order to ensure an aerodynamic sealing between the tip of rotating blades and the casing surrounding said rotating blades, it is known practice to deposit an abradable coating by applying on the internal contour of the casing a layer made of abradable material forming a track for the path from the tip of the blades along the casing.

By “abradable” is meant here that the material is intended to wear out by abrasion upon contact with the blades. The abradable coating is eroded by the passage of the blades, thus allowing the casing to conform to the actual shape of the blade tips.

For high-pressure turbines, that is to say turbines located directly at the outlets of the combustion chamber, the materials used to form the abradable coating are high operating temperature and oxidation-resistant materials which can be made of ceramic such as for example yttria zirconia, alumina or yttrium disilicate, or of metal alloys such as for example CoNiCrAlY which is a cobalt-based alloy including a high proportion of nickel and chromium, for the resistance to oxidation as well as aluminum for the resilience and yttrium for the thermal resistance.

However, the abradable nature of these materials which are capable of withstanding the conditions of use of the high-pressure turbines is very low.

Thus, in order to increase the abradable nature of these materials, the abradable coatings are made of porous materials, the void ratio thus making it possible to control the abradable nature of the material.

However, on the one hand, the current methods for obtaining the abradable material coating and, on the other hand, the resistance to erosion of said abradable material coating caused by the circulation of abrasive particles, impose a void ratio of the abradable material less than 30%, thus limiting the abradable nature of the existing abradable materials.

However, progress in the management of efficiency and fuel consumption leads to an increase in the operating temperatures, particularly for the stages of the high-pressure turbine located directly downstream of the combustion chamber, as well as to a reduction in the clearance between the rotating blades and the casing.

It is therefore necessary to develop abradable materials having sufficient abradable behavior under the operating conditions of the new turbomachines, and in particular for the high-pressure turbines.

SUMMARY

The main aim of the present invention is therefore to overcome such drawbacks by proposing a new abradable coating.

The abradable coating according to the invention offers the advantage of withstanding very high operating temperatures, above 900° C. and for example on the order of 1300° C.

In addition, such an abradable material allows obtaining abradability at least equal to the abradability of existing abradable materials.

In addition, the abradable coating according to the invention has good aerodynamic performance.

The abradable coating according to the invention also has a long service life.

According to a first embodiment, the invention proposes an abradable coating for a turbomachine part which comprises a matrix made of a first ceramic material and particles made of a second ceramic material that are dispersed in said matrix, the first ceramic material having a dynamic viscosity greater than or equal to $10^{12}$ Pa·s at 1300° C., the second ceramic material having a dynamic viscosity less than or equal to $10^{2}$ Pa·s at 1300° C.

According to a possible characteristic of the first embodiment, the second ceramic material is a feldspathic ceramic, a glass ceramic, a hydrothermal glass, silica, or an aluminosilicate-based refractory glass with silica content of at least 60%.

According to another characteristic of the first embodiment, the first material is yttrium disilicate or yttria zirconia.

According to a second embodiment, the invention proposes an abradable coating for a turbomachine part, characterized in that it comprises a matrix made of a first metal material and particles made of a second metal material that are dispersed in said matrix, the first metal material having a melting temperature greater than 900° C., the second metal material having a melting temperature at least 50° C. lower than the melting temperature of the first metal material.

According to an additional characteristic of the second embodiment, the first metal material is MCrAlY, with M referring to Ni and/or Co.

According to a further characteristic of the second embodiment, the second metal material is aluminum or an aluminum alloy, or copper or a copper alloy, or silver, or a silver alloy.

According to a possible characteristic for any one of the embodiments, the particles have an average size comprised between 45 μm and 90 μm.

According to another characteristic for any one of the embodiments, the abradable coating comprises a volume filler content of particles comprised between 30% and 70%.

According to a further characteristic for any one of the embodiments, the abradable coating comprises a void ratio comprised between 5% and 30%.

According to another aspect, the invention proposes a turbomachine comprising a high-pressure turbine, the high-pressure turbine comprising an abradable coating according to any one of the preceding characteristics.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DETAILED DESCRIPTION OF THE INVENTION

Figure 1:
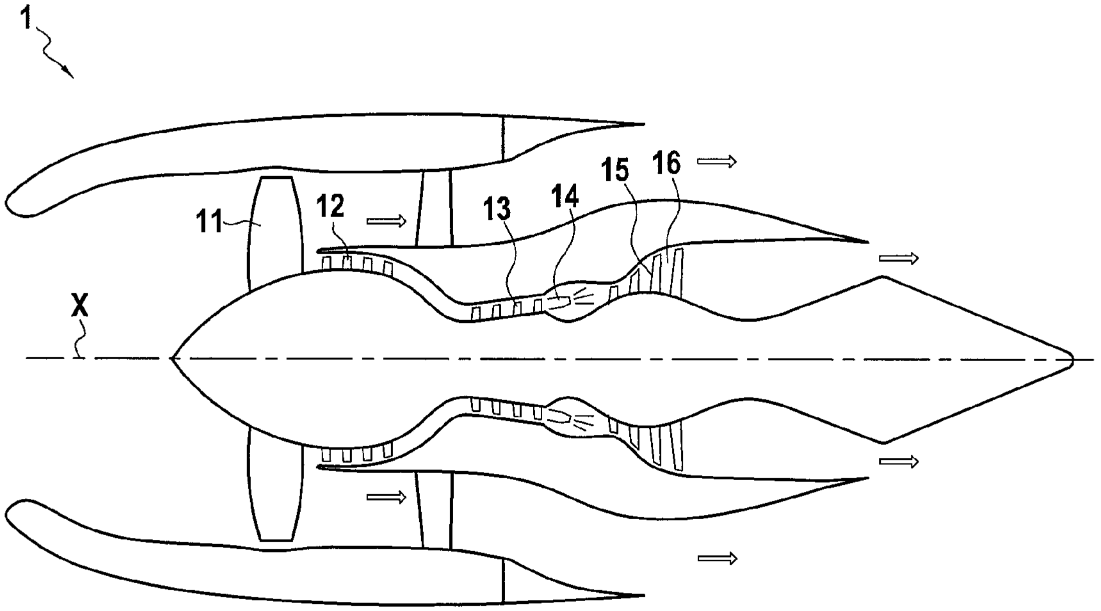
FIG. 1 is a schematic representation of a turbomachine.

As illustrated in FIG. 1, a turbomachine 1, in particular an aircraft turbomachine, comprises:

- a fan 11 located at the inlet of the turbomachine 1;
- a low-pressure compressor 12 downstream of the fan 11;
- a high-pressure compressor 13 downstream of the low-pressure compressor 12;
- a combustion chamber 14 downstream of the high-pressure compressor 13;
- a high-pressure turbine 15 downstream of the combustion chamber; and
- a low-pressure turbine 16 downstream of the high-pressure turbine 15.

The high-pressure turbine 15 comprises rotating bladings 17 located inside an annular casing 18, the tip 171 of the rotating bladings 17 being located facing the casing 18, and more accurately facing the inner wall of the casing 18.

Figure 2:
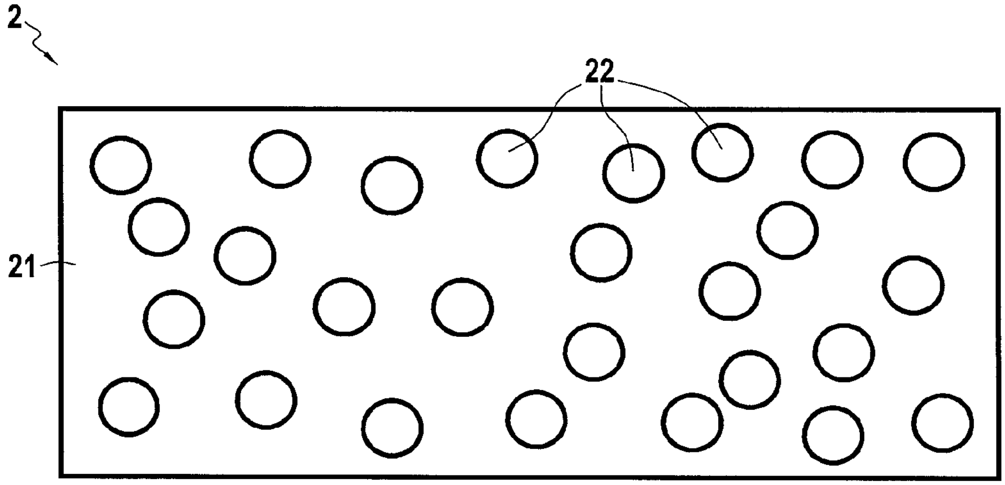
FIG. 2 is a schematic representation of the abradable coating according to the invention.
Figure 3:
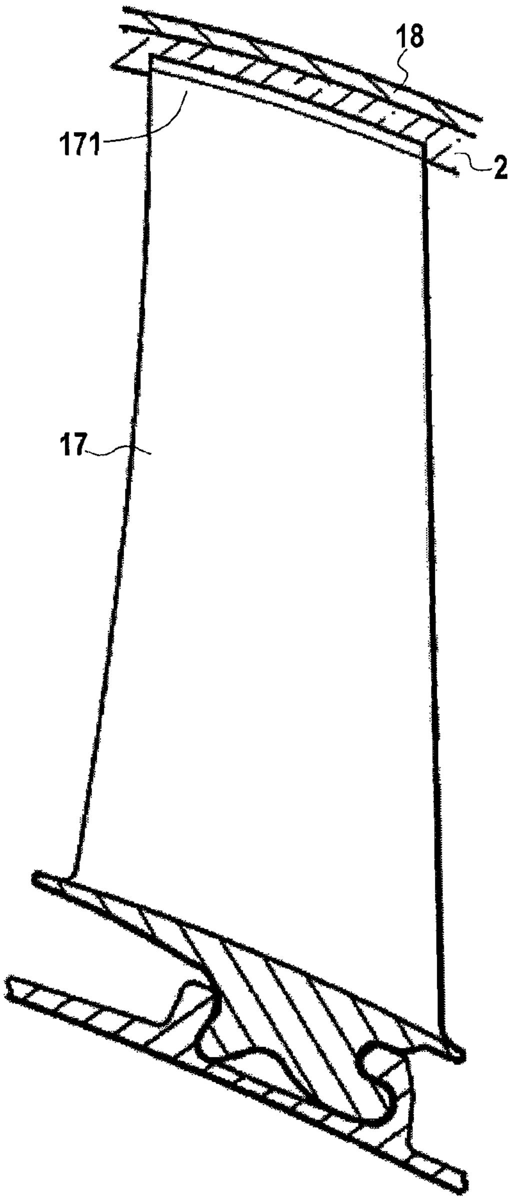
FIG. 3 is a schematic representation of a rotary blading located inside a casing, an abradable coating being deposited on the inner contour of the casing in order to cooperate with the tip of the blading.

In order to improve the performance of the high-pressure turbine 15, an abradable coating 2 as illustrated in FIG. 2 is disposed on the internal contour of the casing 18.

The abradable coating 2 is intended to wear out by abrasion upon contact between the tip 171 of the rotating bladings 17 and the abradable coating 2.

The contact between the tip 171 of the rotating bladings 17 and the abradable coating 2 may for example be due to the thermal expansion of said rotating bladings 17 during the operation of the turbomachine 1.

Such a thermal expansion of the rotating bladings 17 of the high-pressure turbine 15 is all the more significant with the increase in the operating temperature of the turbomachine 1 achieved in order to increase the efficiency of said turbomachine 1 and reduce its fuel consumption.

The operating temperature of the high-pressure turbine 15 is comprised between 900° C. and 1300° C.

The abradable coating comprises a matrix 21 in which particles 22 are dispersed.

The role of the matrix 21 is to ensure the mechanical strength of the abradable coating 2, as well as the resistance to high temperatures, that is to say above 900° C. and preferably above 1300° C., as well as the resistance to oxidation.

The matrix 21 therefore consists of a material capable of maintaining its mechanical properties at a temperature above 900° C., and preferably above 1300° C., and of resisting oxidation at such temperatures.

The particles 22 are for their part used in order to weaken the matrix and provide the abradable coating 2 with its abradable nature.

In order to weaken the matrix 21, the particles 22 are made of a material whose mechanical properties are greatly degraded by the switching to a fluid state upon contact between the abradable coating 2 and the tip of a rotating blading of a high-pressure turbine 15, in order to form areas of weakness in the matrix 21.

Upon contact between the tip of a blading and the abradable coating, the temperature increases very quickly by a hundred degrees.

This increase in temperature switches the particles 22 from a solid state to a fluid state, thus weakening the abradable coating 2 which wears out by abrasion upon contact with the tip of the blading.

Furthermore, in addition to providing the abradable coating 2 with its abradable nature, the fact that the particles 22 form a fluid phase allows smoothing the surface of said abradable coating 2 after contact with the tip of the blading.

The smoothing of the abradable coating 2 allows improving the aerodynamic performance of the casing ring covered with said abradable coating 2.

In addition, the fact that the particles 22 form a fluid phase allows self-healing of the abradable coating 2 upon cooling of said abradable coating 2, the fluid coming from the particles filling the cracks of said abradable coating 2, which are for example caused by a thermal expansion differential, thereby improving the service life of said abradable coating 2.

To achieve such an abradable coating, two variants are possible.

According to a first embodiment, the matrix 21 is made of a first ceramic material, and the particles 22 are in a first ceramic material.

The first ceramic material has a dynamic viscosity greater than or equal to $10^{12}$ Pa·s at 1300° C., while the second ceramic material has a dynamic viscosity less than or equal to $10^{2}$ Pa·s at 1300° C.

The dynamic viscosity is here measured with a Brookfield RVT viscometer equipped with a rotating mobile at 20 rpm or by a flow measurement.

The fact that the first ceramic material, for example, has a dynamic viscosity greater than $10^{12}$ Pa·s at 1300° C. allows the matrix 21 to maintain its mechanical properties, and thus allows the abradable coating 2 to withstand the very high temperature.

The fact that the second ceramic material has a dynamic viscosity less than or equal to $10^{2}$ Pa·s at 1300° C. allows sufficiently weakening the matrix 21.

In addition, such a low viscosity of the second material allows the friction of the tip of the blading to smooth the surface of the abradable coating 2, thus improving the aerodynamic performance of the abradable coating 2.

Such a viscosity also allows the second material constituting the particles 22 to be sufficiently fluid so that it can flow and thus fill any cracks that may appear in the abradable coating 2, thus giving a self-healing effect to said abradable coating 2.

The matrix 21 is preferably made of yttrium disilicate ($Y_2Si_2O_7$), thus allowing the abradable coating 2 to sustainably withstand a 1300° C. operation.

The particles 22 may be made of feldspar ceramic, preferably of feldspar ceramic which has leucite crystal content greater than or equal to 10% because it has improved mechanical strength and an increased thermal expansion coefficient.

The particles 22 can also be made of a glass ceramic, which is a material shaped into the state of glass and then heat-treated to achieve controlled partial crystallization.

The particles 22 can also be made of hydrothermal glass, which is a single-phase material, without a crystalline phase, in the structure of which OH ions have been incorporated.

The particles 22 can also be made of silica $SiO_2$ or of aluminosilicate-based refractory glass where the silica is present at least at 60%.

According to a second embodiment, the matrix 21 is made of a first metal material, and the particles 22 are made of a second metal material.

The first metal material composing the matrix 21 has a melting temperature greater than 900° C., and preferably greater than 1000° C., and even more preferably greater than 1100° C., so as to maintain good mechanical properties and ensure the resistance of the abradable coating 2 at such temperatures.

The second metal material composing the particles 22 has, for its part, a melting temperature at least 50° C. less than the melting temperature of the first metal material.

Such a difference in melting temperature allows the particles 22 to switch into the liquid state upon contact between the tip of a blading and the abradable coating 2 under the effect of the increase in temperature, thus weakening the matrix 21 which remained solid.

Preferably, the second metal material has a melting temperature 50° C. to 200° C. lower than the melting temperature of the first metal material. Indeed, it is advantageous that, on the one hand, the difference in melting temperature is not too significant to prevent the second material from switching into the liquid state at too a low temperature, which would promote the erosion of the abradable coating 2 as well as the surface loss of this liquid phase.

The first material composing the matrix 21 is preferably MCrAlY, with M referring to nickel (Ni), or cobalt (Co), or an alloy of nickel and cobalt.

The second material composing the particles 22 can be for example aluminum or an aluminum alloy for a material base of class 900° C., or for example silver or silver alloy particles, or copper or copper alloy particles for a base material of class 1000-1050° C.

By "aluminum, silver and copper alloy" it is meant here an alloy whose main component is aluminum, silver, and copper, respectively.

The first embodiment offers the advantage of resistance to very high temperatures, on the order of 1300° C., and also has resistance to oxidation at such temperatures.

The second embodiment offers for its part more simplicity of manufacture by its metallic nature, but has a lower resistance to temperature, greater than 900° C. and less than 1300° C.

Furthermore, for the first and second embodiments, the particles 22 can have an average size comprised between 45 μm and 90 μm, thus allowing the particles 22 to be able to switch rapidly into the fluid state.

The term "average size" refers to the dimension given by the statistical particle size distribution to half of the population, called D50.

The particles 22, for any one of the embodiments, are preferably in the form of balls as illustrated in FIG. 2, but can also have an acicular shape.

In addition, for the first and the second embodiment, the abradable coating 2 comprises a volume filler content of particles 22 comprised between 30% and 70%, the matrix 21 occupying the rest.

Such a proportion of particles allows ensuring good abradability of the abradable coating 2, also ensuring a good smoothing effect and a good self-healing effect, while ensuring sufficient resistance of said abradable coating 2.

The abradable coating 2, according to any one of the embodiments, can be manufactured by thermal spraying during which the first material forming the matrix 21 and the second material forming the particles 22 are sprayed together on a support to be covered by being mixed in the desired proportions.

The abradable coating 2 can also be obtained by sintering or by MIM (Metal Injection Molding) process.

Moreover, a pore-forming agent, such as for example polyester or polyamide, can be used during the manufacture of the abradable coating 2 in order to make it porous and improve its abradability, in particular at a lower temperature.

Thus, the abradable coating 2 can comprise a void ratio comprised between 5% and 30%.

The expression "comprised between . . . and . . . " should be understood as including the bounds.

The invention claimed is:

1. An abradable coating for a turbomachine part, comprising a matrix made of a first metal material and particles made of a second metal material that are dispersed in said matrix, the first metal material having a melting temperature greater than 900° C., the second metal material having a melting temperature at least 50° C. lower than the melting temperature of the first metal material, wherein the second metal material is copper or a copper alloy, or silver, or a silver alloy, wherein said abradable coating comprises between 30% and 70% by volume of the particles made of the second metal material, wherein the matrix made of the first metal material comprises a remainder of the volume of said abradable coating.

2. The abradable coating according to claim 1, wherein the first metal material is MCrAlY, with M referring to Ni and/or Co.

3. The abradable coating according to claim 1, wherein the second metal material is copper or a copper alloy.

4. The abradable coating according to claim 1, wherein the particles have an average size between 45 μm and 90 μm.

5. The abradable coating according to claim 1, wherein the abradable coating comprises a void ratio between 5% and 30%.

6. A turbomachine comprising a high-pressure turbine, the high-pressure turbine comprising the abradable coating according to claim 1.

* * * * *